United States Patent Office

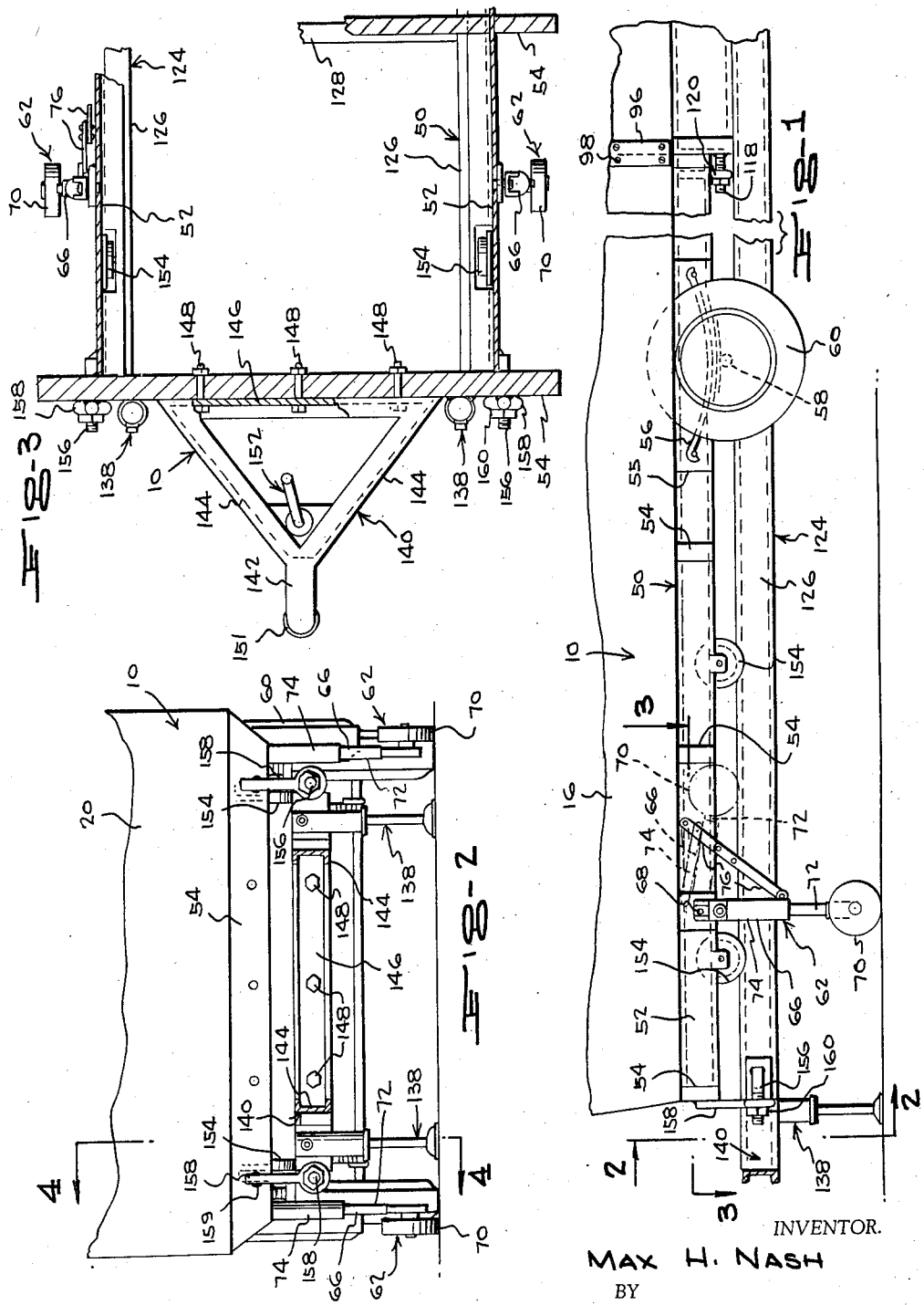

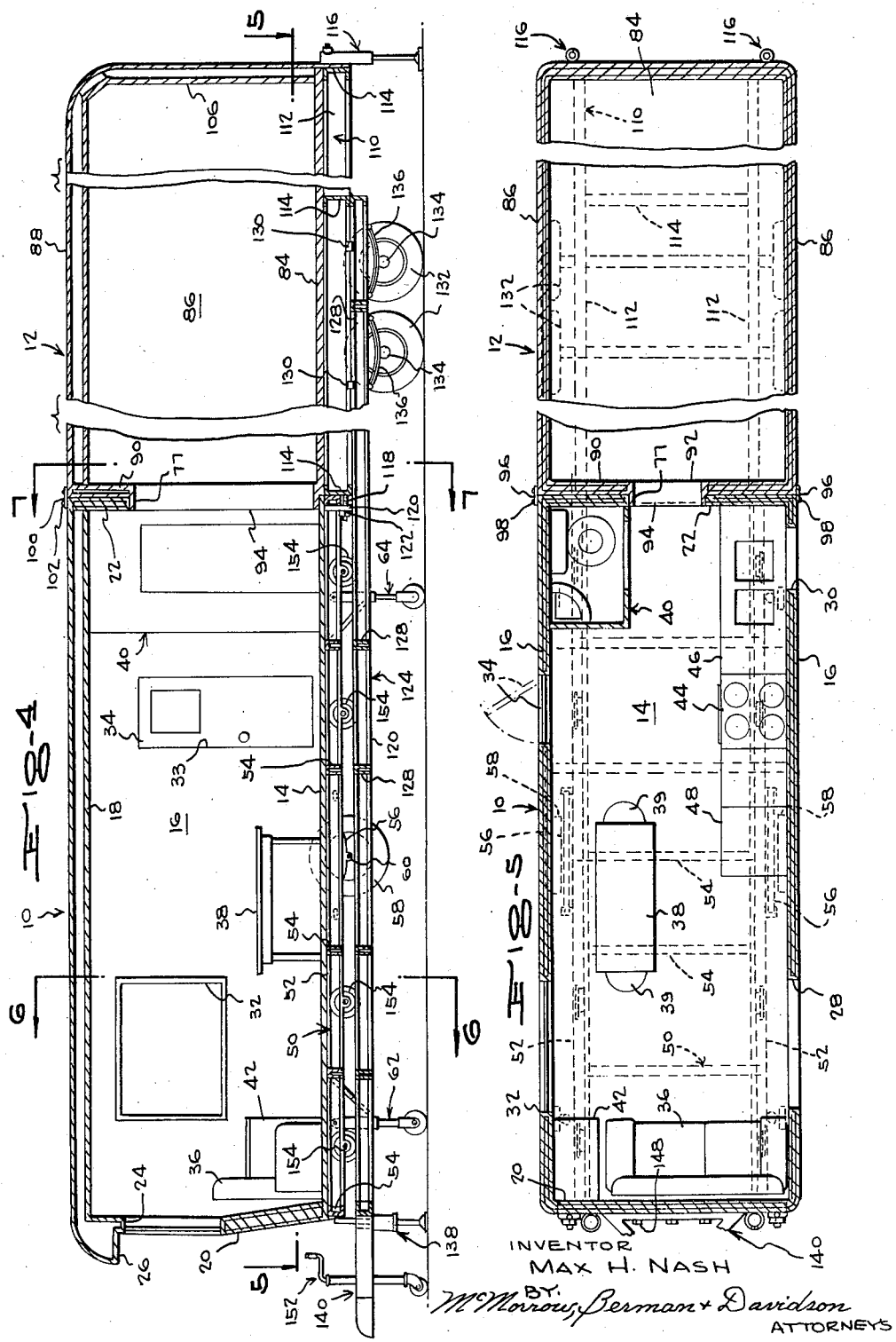

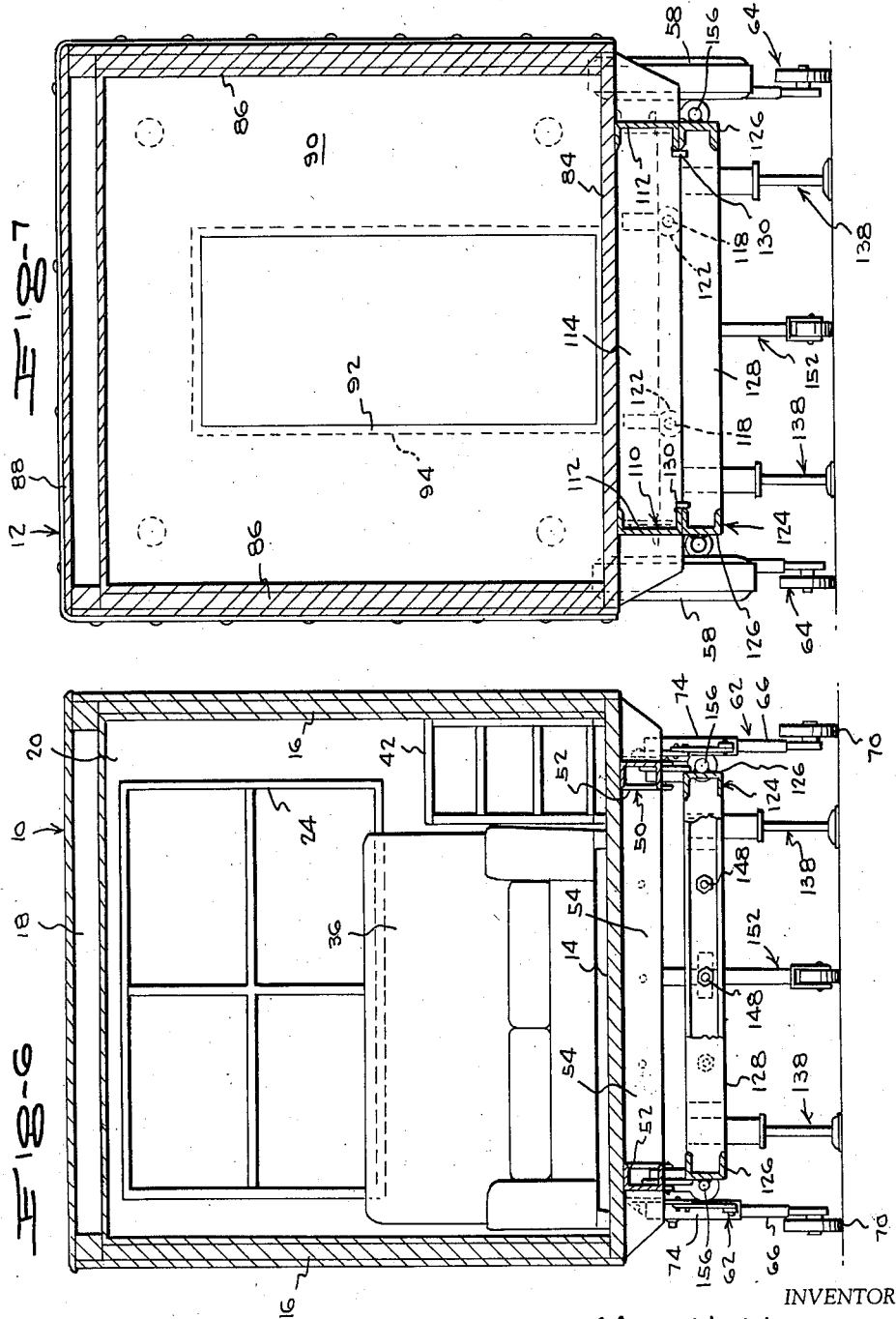

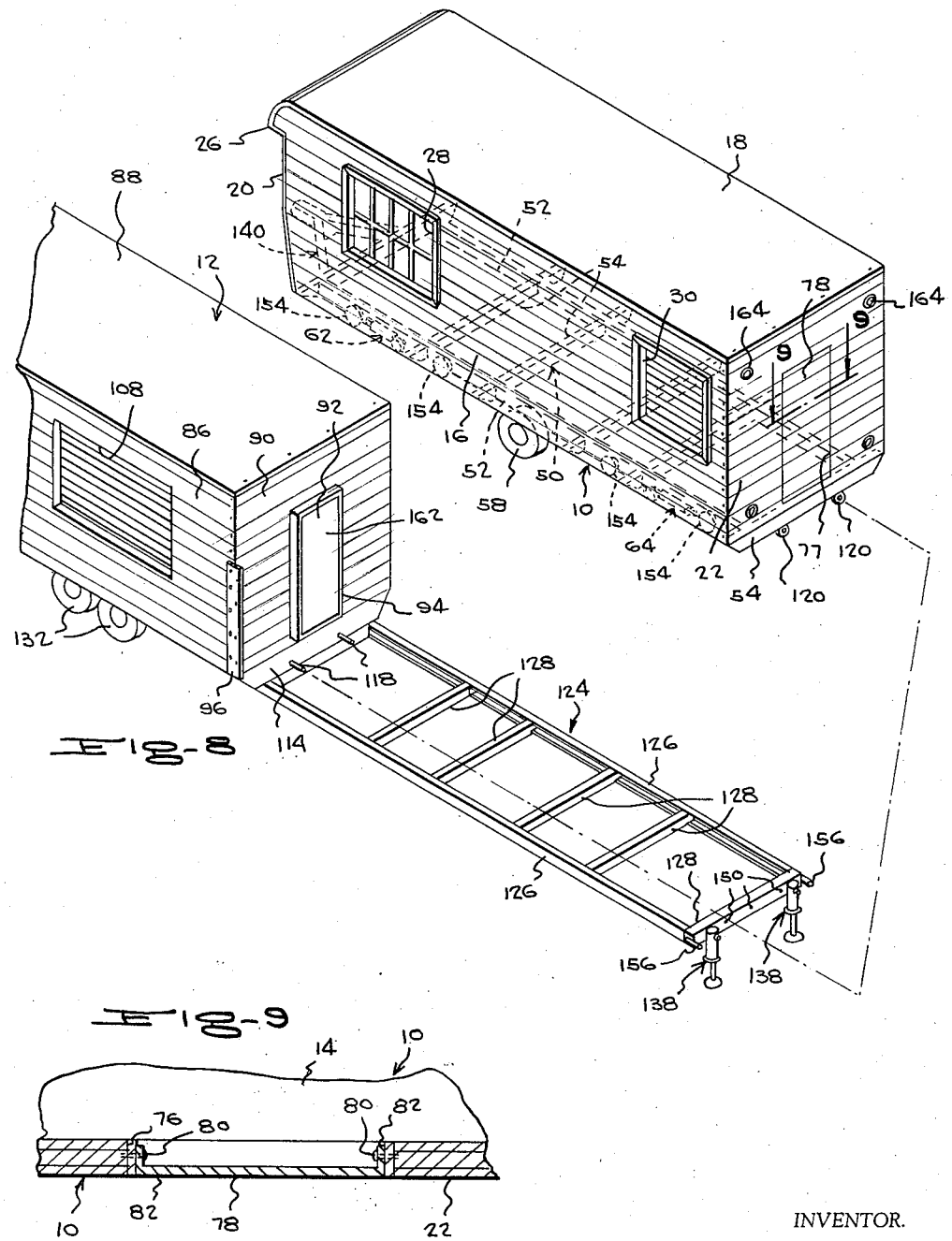

2,899,237
Patented Aug. 11, 1959

2,899,237

DUAL PURPOSE HOUSE TRAILER HAVING SEPARABLY JOINED BODY SECTIONS

Max H. Nash, Lancaster, Calif.

Application November 8, 1957, Serial No. 695,453

7 Claims. (Cl. 296—35)

This invention relates generally to trailers, falling in the broad category of house trailers. More particularly, the invention has reference to a dual purpose trailer which is sectionally constituted, so as to permit the two sections of the trailer to be joined together to provide a single, long trailer, or to permit, alternatively, either section to be drawn behind a vehicle without the other section.

House trailers are, as is well known, of great popularity as residences, both permanent and temporary. A continual trend has developed toward making such trailers more and more complete as regards their interior furnishings, to provide maximum living comfort when the trailer is parked and is in regular use as a residence. However, it has been found that this has produced, in turn, trailers of ever increasing length. At the present time, many trailers in use as residences are of such length as to require that they be drawn behind a truck, rather than behind a conventional passenger automobile, so that the ordinary trailer owner is prevented from hauling his own trailer by reason of the size thereof.

This situation does not present great problems to one who has no desire to use his trailer on vacations, or at some other location besides that at which the trailer is more or less permanently parked. However, a large number of people prefer, when taking vacations, to use their own trailers as residences. Obviously, when one owns a trailer of substantial length, capable of being drawn only behind a truck, he is prevented from making use of the structure for vacation purposes or on other occasions during which he is living temporarily away from his usual residence location.

The main object of the present invention is to provide a trailer which will eliminate the inconveniences noted above, through the provision of a trailer which, when in use at a more or less permanent location as a residence, will be of its full length but which, when in use on vacations or in somewhat similar circumstances, can be separated so as to permit only a single, relatively short section of the trailer to be drawn behind the vehicle, the other section remaining at the mentioned permanent location. By reason of this arrangement, one can use the trailer on a vacation, since the section used will be of sufficient length to include at least temporary sleeping accommodations, said section further including, in a preferred embodiment, a half-bath or lavatory, galley, dining area, and other basic requirements in respect to furnishings.

A more specific object is to provide a sectionally constituted trailer of the type stated which will be characterized by the strength and rigidity of the structure, when the two sections are linked together, the trailer in these circumstances having a bottom frame common to both sections, so that the full size trailer will be of the requisite strength whether parked at its permanent location, or in movement upon the highway.

Another object of importance is to provide a trailer construction which, though having the characteristics noted immediately above, will nevertheless be designed for swift and easy separation or connection of the component trailer sections.

A further object is to insure that the section that is not in use will remain in a stabilized condition, when the other section has been disconnected therefrom and is in use.

Yet another object of importance is to provide a trailer construction of the character stated which will be comparatively inexpensive considering the benefits to be obtained from the use thereof.

Still another object is to so form the trailer that when the sections are connected, they are swiftly brought into communication with each other, with the abutting end walls of the sections being provided with registering door openings and being adapted to serve as an interior partition or wall of the full size trailer.

Other objects will appear from the following description, the claims appended thereto, and from the annexed drawing, in which like reference characters designate like parts throughout the several views, and wherein:

Figure 1 is a fragmentary side elevational view of the head portion of the trailer with the sections connected in end-abutting relation, the structure being shown as it appears when parked for use as a regular residence, a pair of stabilizer or so-called "outrigger" wheels being shown in full and dotted lines in extended and retracted positions respectively;

Figure 2 is a transverse sectional view of the lead section of the trailer as seen from the line 2—2 of Figure 1;

Figure 3 is a horizontal section substantially on line 3—3 of Figure 1;

Figure 4 is a longitudinal sectional view, on a reduced scale, taken substantially on line 4—4 of Figure 2, portions being broken away;

Figure 5 is a horizontal section substantially on line 5—5 of Figure 4, on the same scale as Figure 4;

Figure 6 is a transverse sectional view through the leading section of the trailer, substantially on line 6—6 of Figure 4, on the same scale as Figure 2;

Figure 7 is a transverse sectional view, on the same scale as Figure 6, taken substantially on line 7—7 of Figure 4;

Figure 8 is a reduced, fragmentary perspective view showing the sections separated from one another; and Figure 9 is an enlarged, detail sectional view substantially on line 9—9 of Figure 8.

Referring to the drawing in detail, the trailer constituting the present invention comprises a leading section 10, and a trailing section generally designated 12. It will be understood, in this connection, that particular dimensions, and other structural details, will not be discussed herein, since these can be varied without departure from the spirit of the invention, within, of course, the scope of the appended claims. In the illustrated example, for instance, the leading section is substantially equal in length to the trailing section, but either section could be made substantially longer than the other, and the overall length of the trailer when the sections are connected as in Figure 5 could of course be varied and will depend upon the decisions of the manufacturer. It is mainly important, for the purpose of the present application, to indicate the manner in which the sections are constructed, how they are connected and disconnected, and how one section can be used independently of the other whenever desired.

Considering the construction of the leading section 10, this includes a bottom wall or floor 14, side walls 16, a top wall 18, front wall 20, and back wall 22. Obviously, these walls can be insulated construction, can be hollow or otherwise formed, and in general will be manufactured according to well known practices followed in the trailer manufacturing field. Therefore, details of the wall constructions will not be dwelled upon herein. In a typical embodiment, such as that shown, the front wall 20 may be provided with a window 24, above which is a transversely extending overhang 26. In one side wall there can be a main window 28 and a ventilating window 30, while in the other side wall there can be a window 32 and a door opening 33 in which is fitted a door 34.

The leading end of the section 10 may comprise a living area, and accordingly can be furnished in any of various ways. For example, it may be provided with a sofa 36 in front of which is an open space, it being understood that the sofa can be of the convertible type so as to be converted into a bed, in which event the bed would undoubtedly extend into the open space in a typical working arrangement.

A dining area includes a table 38 and chairs 39, while at the trailing end of section 10 there is an enclosed lavatory or half-bath generally designated at 40 and including the usual plumbing. Beside the sofa there can be an end table 42, serving also as a storage cabinet.

The kitchen or galley is at the trailing end, and includes a stove 44, sink 46, and refrigerator 48. Obviously, the number of furnishings and the nature of the equipment will depend upon the particular size of the trailer and the cost at which it is to be sold. I do not desire, accordingly, to be limited to any particular arrangement of furniture, or any particular equipment that would be included in either of the trailer sections.

Referring now to Figures 1 and 3, generally designated at 50 is a bottom frame of the lead section 10, this comprising a horizontal rectangular framework extending the full length of the leading section and secured to and underlying the floor 14. The frame 50 includes longitudinal channels providing side frame members 52, said channels extending substantially the full length of section 10 and being rigid with cross members 54 spaced apart over the full length of the section 10 as clearly shown in Figure 4. In the preferred illustrated embodiment, the longitudinal frame members 52 are laterally offset inwardly from the respective side walls, while the cross members 54 project laterally outwardly beyond the respective side members 52, fully to the locations of the vertical planes of the side walls 16.

Intermediate the opposite ends of the leading section, there are provided transversely spaced ground wheels. Support plates 55 (Figure 1) for the ground wheels are provided, and shackled to the support plates are springs 56, providing a suspension for a transversely disposed axle 58 on which are mounted the rubber-tired ground wheels 60.

Of course, the wheels are so located that when the leading section 10 is being drawn behind a vehicle without the trailing section, as for example on a vacation or short trip, a proper balance is maintained, assuring a stabilized, rollable supporting of the section 10 of the trailer.

This, of course, is well within the skill of those working in the art and need not be discussed in further detail herein.

In any event, also constituting part of the leading section of the trailer are front and rear stabilizing wheel assemblies generally designated 62, 64 respectively (see Figure 4). These are identically but oppositely arranged, so the description of the assembly 62 will suffice for the assembly 64.

Referring to Figures 1 and 3, stabilizer wheel assemblies 62 are provided at opposite sides of the device, below the side walls, the respective assemblies being mounted upon the respective members 52 as best shown in Figure 3.

Each assembly 62 includes a telescopic arm 66 which is hinged at 68 upon the associated member 52 for swinging movement between the retracted and extended positions shown in dotted and full lines, respectively, in Figure 1. The sections of the arm would be connected in the manner of a conventional jack, so that when the arm is retracted to its dotted line position of Figure 1, the lower section, carrying the ground wheel 70, can be retracted into the upper section. The lower section of each arm is designated at 72 with the upper section being designated at 74.

Constituting a collapsible brace for the arm when it is in its extended position are toggle links 76 pivotally connected together and providing a toggle that is connected at its respective ends to the telescoping arm and channel 52.

Referring now to Figures 8 and 9, in rear wall 22 of section 10 there is a centrally disposed door opening 77, and when the section 10 is disconnected from the trailing section 12, in the manner shown in Figure 8, a closure panel 78 is secured within said opening by fastening elements 80 passing through flanges 82 of the panel 78.

The trailing section 12 includes a bottom wall 84, side walls 86, and a top wall 88. A front wall 90 is provided centrally thereof with an opening 92 registering with opening 77 and bounded by a forwardly projecting, continuous flange 94 which, when the sections are connected together as in Figures 4 and 5, fits snugly in opening 77.

At the sides of the trailing section there are provided vertically disposed connecting strips 96, shown only fragmentarily in Figure 8. The connecting strips 96 are in overlapping relation to the side walls of the leading section, when the two sections are connected, as clearly shown in Figure 5. The strips may extend the full height of the trailer, and are connected to the side wall 16 of the lead section by bolts 98 or equivalent means. A top strip 100 may also be provided upon the trailing section, extending across the roof thereof, said top strip 100 being connected by bolts 102 (see Figure 4) or equivalent means to the roof 18 of the lead section. This provides for a sealed connection at the side and top, between the trailer sections when the sections are connected for use of the trailer as a residence in the manner shown in Figures 4 and 5, and said strip could of course be provided with suitable flashing or gasket means, to insure against leakage between the abutting walls 22, 90 of the respective sections.

Also provided upon the trailing section is a back wall 106 and in the side walls 86 there may be provided window openings such as shown at 108 in Figure 8. Any desired furnishings can be provided in the trailing section 12, of course, and a desirable characteristic of the invention resides in the fact that when the sections are connected so that the trailer is in use as a full-sized trailer home, the abutting walls 22, 90 provide a transverse partition assuring maximum privacy for the various areas of the trailer.

A bottom frame generally designated 110, provided upon section 12, includes side frame members 112 between which are connected transverse frame members 114. Members 112 are aligned longitudinally with members 52 of the lead section, and members 114 project laterally outwardly from the members 112 in the same manner as the members 54 project laterally outwardly from the sections 52.

Secured to the rear end of the section 12 are transversely spaced, vertically disposed support jacks generally designated at 116. Conventional jacks are used, and hence the detailed construction thereof need not be set forth herein. The jacks provide for stabilized, firm supports of the rear section 12 when the same is parked. The jacks are of course retracted when the section 12 is being moved.

Rigid with and projecting forwardly from the forwardmost cross member 114 are aligning pins 118 (see Figure 8) adapted to extend into plates 120 provided at the rear end of the bottom frame 50 of the lead section 10. The pins 118 are threaded (see Figure 4) so that when they are extended through the plates 120, nuts 122 can be applied to the pins to fixedly connect the two trailer sections to each other in their end-abutting relationship.

A main support frame has been generally designated at 124, and is of a length such that it will extend, when the trailer sections are connected together, fully from the head end of the section 10 to a location intermediate opposite ends of the section 12. The main frame 124 is horizontally disposed, is of rectangular configuration, and comprises a pair of side frame members 126 formed as confronting channels that extend below the respective side members 52, 112 of the sections 10, 12 respectively (see Figures 6 and 7). Fixedly connected to and extending between members 126, at selected locations along the length of the frame 124, are cross members 128 of the main frame.

The rear end portion of the main frame, that is, the portion underlying section 12, is welded to or otherwise fixedly connected to the respective side frame members 112 of section 12, through the provision of plates 130 (Figure 7), which plates are welded both to the members 112 and the members 126 at a plurality of locations spaced along the length of the same (see Figure 4).

Referring to Figure 4, at its rear end the frame 124 is rollably supported, through the provision of tandem wheels 132 at each side of the section 12. These are in use while the full-sized trailer is being hauled from one location to another, said wheels 132 being carried by axles 134 mounted upon springs 136.

Referring now to Figure 8, at its leading end, frame 124 has connected thereto a pair of transversely spaced supporting jacks generally designated 138 and adapted to be lowered when the trailer is in regular use as a residence with its sections connected or disconnected.

Generally designated at 140 is a triangular hitch assembly, having a draw bar 142 fixedly secured to rearwardly divergent members 144 integral or otherwise made rigid at their rear ends with a transversely extending rear or cross bar 146 having a plurality of openings adapted to receive bolts 148 that extend also through openings 150 (see Figure 8) provided in the forwardmost member 128 of frame 124. The hitch assembly thus is removably connected to the frame 124, the purpose of this arrangement being that the hitch assembly will be connected to the forward end of frame 124 when the full-sized trailer shown in Figures 4 and 5 is being hauled. On the other hand, when only the leading section 10 is to be hauled on the roadway, the hitching assembly can be connected to the head end of said section 10, since the forwardmost cross member of the frame 50 has openings registering with the bolt-receiving openings of member 146 of assembly 140.

Assembly 140 also includes, in addition to the usual socket 151, a leveling means in the form of a castered, crank-operated, downwardly extendable jack generally designated at 152 and constituting, per se, a conventional part of trailer structures already well known in the art. This is lowered when the full sized trailer is parked.

Spaced longitudinally of the respective side members 52 are flanged rollers 154, rolling upon the respective members 126, the flanges of the rollers engaging against the outer surfaces of the members 126, so that the members 126 constitute guide rails or tracks for the rollers, during rolling of the lead section 10 onto or off the frame 124.

Referring now to Figures 1 and 2, welded or otherwise fixedly secured to the forwardmost cross member 128 of frame 124 are forwardly projecting, threaded studs 156 also shown to particular advantage in Figure 8. These are adapted to extend through the circular, apertured lower portions of connector plates 158, which at their upper ends are welded as at 159 (see Figure 2) to the forwardmost cross member 54 of trailer section 10. Nuts 160 are threaded onto the studs 156, as shown in Figure 1, to thus securely connect the section 10 at its front end to the forward edge portion of the main frame 124. The nuts prevent the section 10 from moving forwardly upon frame 124, and of course rearward movement of the section 10 is prevented by the trailing section 12. Forward movement of the section 10 from its assigned position shown in Figures 4 and 5 is also prevented, of course, by the bolted connection of the strips 96, 100 of section 12 to the trailer section 10. Movement is further prevented by bolts or pins 118 engaged in plates 120 and locked by nuts applied to the bolts.

In use, and assuming that the section 10 has been previously disconnected from section 12 and from main frame 124, said section 10 can be employed as a house trailer in and of itself, adapted to be drawn behind a conventional passenger vehicle and including all necessary equipment. The section 10, with the hitch assembly 140 conected thereto, can thus be used on a vacation, or on a relatively short motor trip.

Upon return from said trip, the section 10 is connected to the section 12, to provide a full-sized trailer as shown in Figures 4 and 5, usable as a permanent or semipermanent residence. Of course, while the trailer section 10 is in individual use, the wheels 58 constitute the sole contact between the same and the ground surface.

It should be noted that strips 96, 100 are for weatherproofing and are not intended as locking devices.

To connect the sections to each other, the section 10 is backed up to the main frame 124 in longitudinal alignment therewith, after which the auxiliary or guide wheel assemblies 62, 64 are lowered and the arms thereof extended, thus jacking up the section 10 to the height shown in Figures 4 and 6.

The section 10 is now rolled rearwardly onto the main frame 124. The rollers 154, of course, almost immediately contact the rails 126, so that the section 10 rolls smoothly to its Figure 4 position. When in its Figure 4 position, it is disposed with flange 94 of trailer section 12 extending into opening 76. The fastener elements 98, 104 are now applied to connect the strips 96, 100 to the trailer section 10. Thereafter, the jacks 116, 138 may all be extended, to raise the full size trailer slightly so as to insure that there will be no load on the wheels 132, so that the trailer is now available as a full size, parked residence.

Lead section frame 50 is slightly wider than main frame 124 to allow the flanges of wheels 154 to grip the edge of frame 124 and prevent side slippage.

Of course, if the full size trailer is to be moved, it would be drawn behind a truck or other vehicle equipped specially for this purpose. In this event, the hitch assembly 140 is connected to the forward end of the frame 124 in the manner shown in Figure 4, the jacks 116, 138 are retracted with assemblies 62, 64 of course remaining in retracted position, and the stabilizer wheel assembly 152 is also retracted. The entire trailer is now supported upon the tandem set of wheels 132, ready for highway movement.

Whenever the trailer section 10 is in use alone, the opening 92 of section 12 may be closed by a filler or closure panel 162 (Figure 8).

Various design features may be incorporated in the invention. For example, there may be countersunk running lights 164 on section 10 (see Figure 8). These would not of course interfere with connection of the sections.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A trailer comprising: an elongated, rollable main frame; a hitch assembly removably mounted thereon; and an enclosed body supported upon the main frame, said body including a rear trailer body section mounted on one end portion of said main frame and a leading trailer section mounted on the other end portion of said main frame, said leading section being removable from the main frame and being adapted for use as a trailer independently of the rear section, said leading section including ground wheels and said hitch assembly being selectively connectable to each of the main frame and leading section, said sections when mounted upon the main frame being disposed in end-abutting relation and having communicating openings at their abutting ends.

2. A trailer comprising: an elongated, rollable main frame; a hitch assembly removably mounted thereon; and an enclosed body supported upon the main frame, said body including a rear trailer body section mounted on one end portion of said main frame and a leading trailer section mounted on the other end portion of said main frame, said leading section being removable from the main frame and being adapted for use as a trailer independently of the rear section, said leading section including ground wheels and said hitch assembly being selectively connectable to each of the main frame and leading section, said sections when mounted upon the main frame being disposed in end-abutting relation and having communicating openings at their abutting ends, one of the sections including a flange surrounding the opening thereof and extending into the opening of the other section in the end-abutting relationship of the sections.

3. A trailer comprising: an elongated, rollable main frame; a hitch assembly removably mounted thereon; an enclosed body supported on the main frame, said body including a rear trailer body section mounted on one end portion of said main frame and a leading trailer section mounted on the other end portion of said main frame, said leading section being removable from the main frame and being adapted for use as a trailer independently of the rear section, said leading section including ground wheels and said hitch assembly being selectively connectable to each of the main frame and leading section, said sections when mounted upon the main frame being disposed in end-abutting relation and having communicating openings at their abutting ends, one of the sections including a flange surrounding the opening thereof and extending into the opening of the other section in the end-abutting relationship of the section; and side and top strips on one of the sections disposed to overlap the other section in the end-abutting relationship of the sections, said strips being connectable to said other section to provide a seal about the abutting ends thereof.

4. A trailer comprising: an elongated, rollable main frame; an enclosed body supported thereon including a rear trailer body section mounted on one end portion of said main frame and a leading trailer section mounted on the other end portion of said main frame, said leading section being removable from the main frame and being adapted for use as a trailer independently of the rear section, said leading section including ground wheels; and a hitch assembly connectable selectively to the main frame and the leading trailer section.

5. A trailer comprising: an elongated, rollable main frame; a hitch assembly removably mounted thereon; an enclosed body supported on the main frame, said body including a rear trailer body section mounted on one end portion of said main frame and a leading trailer section mounted on the other end portion of said main frame, said leading section being removable from the main frame and being adapted for use as a trailer independently of the rear section, said leading section including ground wheels and said hitch assembly being selectively connectable to each of the main frame and leading section, said leading section including a plurality of rollers, the main frame being formed with side rails on which said rollers are supported for rolling movement of the leading trailer section onto and off the main frame; and a plurality of jacks carried by the main frame at opposite ends thereof adapted for elevating the same to provide a stationary support for the trailer sections.

6. A trailer comprising: an elongated, rollable main frame; a hitch assembly removably mounted thereon; an enclosed body supported on the main frame, said body including a rear trailer body section mounted on one end portion of said main frame and a leading trailer section mounted on the other end portion of said main frame, said leading section being removable from the main frame and being adapted for use as a trailer independently of the rear section, said leading section including ground wheels and said hitch assembly being selectively connectable to each of the main frame and leading section, said leading section including a plurality of rollers, the main frame being formed with side rails on which said rollers are supported for rolling movement of the leading trailer section onto and off the main frame; a plurality of jacks carried by the main frame at opposite ends thereof adapted for elevating the same to provide a stationary support for the trailer section; and a plurality of pivotally mounted, depending stabilizer wheel assemblies of adjustable length carried by the leading section to provide a rollable, ground-engaging support thereof during movement of the leading section onto and off of the main frame.

7. A trailer comprising: an elongated, rollable main frame; a hitch assembly removably mounted thereon; an enclosed body supported on the main frame, said body including a rear trailer body section mounted on one end portion of said main frame and a leading trailer section mounted on the other end portion of said main frame, said leading section being removable from the main frame and being adapted for use as a trailer independently of the rear section, said hitch assembly being selectively conectable to each of the main frame and leading section, said leading section including a plurality of rollers, the main frame being formed with side rails on which said rollers are supported for rolling movement of the leading trailer section onto and off the main frame; a plurality of jacks carried by the main frame at opposite ends thereof adapted for elevating the same to provide a stationary support for the trailer sections; and a plurality of pivotally mounted, depending stabilizer wheel assemblies of adjustable length carried by the leading section to provide a rollable, ground-engaging support thereof during movement of the leading section onto and off of the main frame, said leading section including ground wheels adapted to provide a rollable support therefor when the leading section is removed from the main frame, said stabilizer wheel assemblies being retractable to positions above the ground during contact of the last named wheels of the leading section with the ground surface.

References Cited in the file of this patent

UNITED STATES PATENTS

| 1,541,457 | Winn | June 9, 1925 |
| 2,761,581 | Cohee | Sept. 4, 1956 |

FOREIGN PATENTS

| 319,933 | Great Britain | Oct. 3, 1929 |